US010385809B2

(12) United States Patent
Prociw

(10) Patent No.: US 10,385,809 B2
(45) Date of Patent: Aug. 20, 2019

(54) FUEL NOZZLES

(71) Applicant: Delavan Inc, West Des Moines, IA (US)

(72) Inventor: Lev A. Prociw, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 639 days.

(21) Appl. No.: 14/674,709

(22) Filed: Mar. 31, 2015

(65) Prior Publication Data

US 2016/0290291 A1 Oct. 6, 2016

(51) Int. Cl.
| | |
|---|---|
| *F02M 31/20* | (2006.01) |
| *F23R 3/14* | (2006.01) |
| *F23R 3/28* | (2006.01) |
| *F23D 11/36* | (2006.01) |
| *F02C 7/22* | (2006.01) |

(52) U.S. Cl.
CPC ............... *F02M 31/20* (2013.01); *F02C 7/22* (2013.01); *F23D 11/36* (2013.01); *F23R 3/14* (2013.01); *F23R 3/283* (2013.01)

(58) Field of Classification Search
CPC . F02M 31/20; F02C 7/22; F23D 11/36; F23R 3/14; F23R 3/283
USPC .......................... 60/737, 740, 39.83; 239/128
See application file for complete search history.

(56) References Cited

U.S. PATENT DOCUMENTS

| | | | |
|---|---|---|---|
| 1,875,457 A | 9/1932 | Hemmingsen | |
| 2,607,193 A | 8/1952 | Berggren et al. | |
| 3,680,793 A | 8/1972 | Tate et al. | |
| 3,912,164 A | 10/1975 | Lefebvre et al. | |
| 3,937,011 A | 2/1976 | Caruel et al. | |
| 3,980,233 A | 9/1976 | Simmons et al. | |
| 4,598,553 A | 7/1986 | Saito et al. | |

(Continued)

FOREIGN PATENT DOCUMENTS

| | | |
|---|---|---|
| BE | 488386 A | 4/1949 |
| EP | 0689007 A1 | 12/1995 |

(Continued)

OTHER PUBLICATIONS

Extended European Search Report dated Aug. 8, 2016, issued during the prosecution of European Patent Application No. EP 16163366.4 (8 pages).

(Continued)

*Primary Examiner* — Phutthiwat Wongwian
*Assistant Examiner* — Loren C Edwards
(74) *Attorney, Agent, or Firm* — Locke Lord LLP; Scott D. Wofsy; Alicia J. Carroll

(57) ABSTRACT

A nozzle includes a nozzle body defining a longitudinal axis. The nozzle body has an air passage, a fuel circuit radially outboard from the air passage with respect to the longitudinal axis, and a cooling circuit. The fuel circuit extends from a fuel circuit inlet to a fuel circuit annular outlet. The fuel circuit is defined between a fuel circuit inner wall and a fuel circuit outer wall. At least a portion of the fuel circuit outer wall is radially outboard from the fuel circuit inner wall with respect to the longitudinal axis. A cooling circuit is defined within at least one of the fuel circuit inner wall or the fuel circuit outer wall. The cooling circuit extends from an axial position proximate the fuel circuit inlet to an axial position proximate the fuel circuit outlet.

20 Claims, 6 Drawing Sheets

(56) References Cited

U.S. PATENT DOCUMENTS

| | | | |
|---|---|---|---|
| 4,653,278 | A | 3/1987 | Vinson et al. |
| 5,409,169 | A | 4/1995 | Saikalis et al. |
| 5,713,206 | A | 2/1998 | McWhirter et al. |
| 5,860,600 | A | 1/1999 | Schindler et al. |
| 6,003,781 | A | 12/1999 | Kwan |
| 6,092,363 | A | 7/2000 | Ryan |
| 6,247,317 | B1 | 6/2001 | Kostka |
| 6,360,525 | B1 | 3/2002 | Senior et al. |
| 6,363,726 | B1 | 4/2002 | Durbin et al. |
| 6,533,954 | B2 | 3/2003 | Mansour et al. |
| 6,571,559 | B1 * | 6/2003 | Fortuna ............... F02C 7/22 60/748 |
| 6,622,488 | B2 | 9/2003 | Mansour et al. |
| 6,688,534 | B2 | 2/2004 | Bretz |
| 6,755,024 | B1 | 6/2004 | Mao et al. |
| 6,775,984 | B2 * | 8/2004 | Lavie ............... F23D 11/36 239/132.3 |
| 6,854,670 | B2 | 2/2005 | Sumisha et al. |
| 6,863,228 | B2 | 3/2005 | Mao et al. |
| 7,454,914 | B2 | 11/2008 | Prociw |
| 7,509,811 | B2 | 3/2009 | Chen et al. |
| 7,520,134 | B2 | 4/2009 | Durbin et al. |
| 7,533,531 | B2 | 5/2009 | Prociw et al. |
| 7,654,088 | B2 | 2/2010 | Shafique et al. |
| 7,891,193 | B2 | 2/2011 | Hernandez et al. |
| 7,926,178 | B2 | 4/2011 | Thomson et al. |
| 7,926,282 | B2 | 4/2011 | Chew et al. |
| 8,015,796 | B2 | 9/2011 | Babu et al. |
| 8,074,452 | B2 | 12/2011 | Prociw et al. |
| 8,171,735 | B2 | 5/2012 | Mancini et al. |
| 8,186,163 | B2 | 5/2012 | Hernandez et al. |
| 8,347,630 | B2 | 1/2013 | Lovett et al. |
| 8,733,105 | B2 | 5/2014 | Toon |
| 9,383,097 | B2 * | 7/2016 | Thomson ............... F23R 3/28 |
| 2002/0134084 | A1 | 9/2002 | Mansour et al. |
| 2005/0039456 | A1 | 2/2005 | Hayashi |
| 2005/0133642 | A1 | 6/2005 | Rackwitz |
| 2005/0279862 | A1 | 12/2005 | Mao et al. |
| 2007/0101727 | A1 | 5/2007 | Prociw |
| 2008/0236165 | A1 | 10/2008 | Baudoin et al. |
| 2009/0050710 | A1 | 2/2009 | Myers et al. |
| 2009/0111063 | A1 | 4/2009 | Boardman et al. |
| 2009/0224080 | A1 | 9/2009 | Chew et al. |
| 2009/0255258 | A1 | 10/2009 | Bretz et al. |
| 2010/0050644 | A1 | 3/2010 | Pidcock et al. |
| 2011/0031333 | A1 | 2/2011 | Short |
| 2012/0039761 | A1 | 2/2012 | Sprouse et al. |
| 2012/0151930 | A1 * | 6/2012 | Patel ............... F23D 11/383 60/746 |
| 2012/0186259 | A1 | 7/2012 | Hoke |
| 2012/0228397 | A1 * | 9/2012 | Thomson ............... F23R 3/28 239/13 |
| 2014/0090382 | A1 | 4/2014 | Sandelis et al. |
| 2014/0318137 | A1 | 10/2014 | McMasters et al. |
| 2014/0332602 | A1 | 11/2014 | Cramb et al. |
| 2014/0339339 | A1 | 11/2014 | Prociw |

FOREIGN PATENT DOCUMENTS

| | | |
|---|---|---|
| EP | 1526332 A2 | 4/2005 |
| EP | 2497922 A2 | 9/2012 |
| EP | 2500641 A1 | 9/2012 |
| EP | 2589866 A2 | 5/2013 |
| EP | 2775202 A2 | 9/2014 |
| GB | 2131154 A | 6/1984 |
| GB | 2459041 A | 10/2009 |
| GB | 2459771 A | 11/2009 |
| JP | 2005061715 A | 3/2005 |
| WO | WO-1989/05195 A1 | 6/1989 |
| WO | WO-2005061964 A1 | 7/2005 |
| WO | WO-2014011405 A1 | 1/2014 |

OTHER PUBLICATIONS

International Search Report for PCT Application No. PCT/US2013/048201 dated Sep. 25, 2013.
R. Tacina et al., "Experimental Investigation of a Multiplex Fuel Injector Module with Discrete Jet Swirlers for Low Emission Combustors", NASA/TM-2004-212918; AIAA-2014-0185 (2004).
C. Lee et al., "High Pressure Low Nox Emissions Research: Recent Progress at NASA Glenn Research Center", ISABE-2007-1270 (2007).
K.M. Tacina et al., NASA Glenn High Pressure Low NOX Emissions Research; NASA/TM-2008-214974 (2008).
Extended European Search Report dated Aug. 17, 2016, issued during the prosecution of European Patent Application No. 16163374.8 (4 pages).
Extended European Search Report dated Dec. 22, 2016, issued during the prosecuution of European Patent Application No. EP 12191139.0 (9 pages).
U.S. Appl. No. 14/674,580, filed Mar. 31, 2015.

* cited by examiner

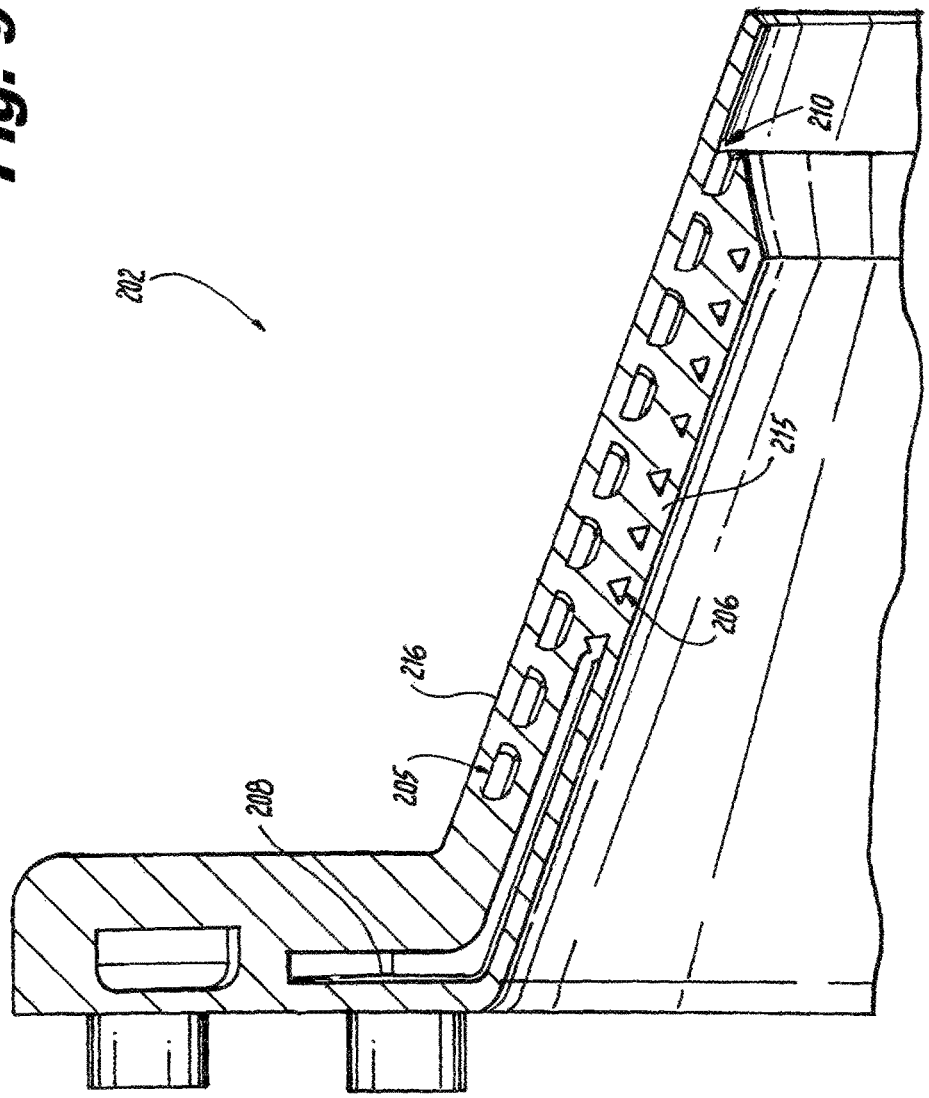

FUEL NOZZLES

BACKGROUND OF THE INVENTION

1. Field of the Invention

The present disclosure relates to nozzles, and more particularly to fuel nozzles such as those used in combustors of gas turbine engines.

2. Description of Related Art

A variety of engines typically incorporate fuel injectors or nozzles in their combustion sections in which fuel and air are mixed and combusted. Efficiency of combustion is related to a variety of factors including fuel-to-air ratio, ignition source location and degree of fuel atomization. Fuel is typically sprayed from a pressure atomizer and then mixed with flows of air. Fuel staging requires that some nozzles of the fuel injector are stopped from flowing fuel during a given mission. Lack of fuel flow and high combustion temperatures can make the nozzle prone to coking, especially those parts closest to the flame.

Such conventional methods and systems have generally been considered satisfactory for their intended purpose. However, there is an ongoing need in the art for improved fuel nozzles. The present disclosure provides a solution for this need.

SUMMARY OF THE INVENTION

A nozzle includes a nozzle body defining a longitudinal axis. The nozzle body has an air passage, a fuel circuit radially outboard from the air passage with respect to the longitudinal axis, and a cooling circuit. The fuel circuit extends from a fuel circuit inlet to a fuel circuit annular outlet. The fuel circuit is defined between a fuel circuit inner wall and a fuel circuit outer wall. At least a portion of the fuel circuit outer wall is radially outboard from the fuel circuit inner wall with respect to the longitudinal axis. A cooling circuit is defined within at least one of the fuel circuit inner wall or the fuel circuit outer wall. The cooling circuit extends from an axial position proximate the fuel circuit inlet to an axial position proximate the fuel circuit outlet.

The nozzle can include a stem operatively connected to a fuel manifold of the nozzle body. The stem can include three liquid channels for fluid communication with at least one of the fuel circuit or the cooling circuit. The three liquid channels can be a fuel channel in fluid communication with the fuel manifold to provide fuel to the fuel circuit inlet, a coolant-in channel in fluid communication with a distribution channel of the cooling circuit to provide coolant thereto, and/or a coolant-out channel in fluid communication with the collection channel of the cooling circuit to receive coolant therefrom.

The cooling circuit can include a distribution channel in fluid communication with a coolant-in channel and a collection channel in fluid communication with a coolant-out channel. The distribution channel and the collection channel can be circumferentially spaced apart from one another, and/or co-planar with one another. The cooling circuit can include a pair of helical threads. A first one of the helical threads can begin at the distribution channel and extend to an axial position proximate the fuel circuit outlet to provide cooling flow to the nozzle tip. A first end of a second one of the helical threads can be connected to the first helical thread proximate to the fuel circuit outlet and can extend to the collection channel to provide a cooling flow exit to the coolant-out channel. The first end of the second one of the helical threads can be connected to the first helical thread through a short circuit segment.

The nozzle body can include a pair of tubes defined through the air passage and though a fuel manifold, wherein one of the tubes fluidly connects the distribution channel to the cooling circuit inlet and another one of the tubes fluidly connects the collection channel to the cooling circuit outlet. The air passage includes an annular inlet having radial swirl vanes circumferentially spaced apart from one another. The tubes can be defined within the radial swirl vanes. The air passage can be defined between a backing plate and a fuel circuit inner wall downstream from the backing plate. At least a portion of the fuel circuit inner wall can be a conical shape that converges toward the longitudinal axis in a downstream direction. The air passage can include an annular inlet, a radial swirler, and/or a converging conical cross-section. The radial swirler can include radial swirl vanes circumferentially spaced apart from one another about the annular inlet to induce swirl into air entering the annular inlet of the air passage.

The nozzle body can include an outer air passage defined radially outboard of the fuel circuit with respect to the longitudinal axis. The outer air passage can be defined between a fuel circuit outer wall and an outer air passage wall. The outer air passage can be a converging non-swirling outer air passage. These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 9 is an enlarged cross-sectional side elevation view of a portion of another nozzle constructed in accordance with the present disclosure, showing a cooling circuit in the outer fuel circuit wall.

DETAILED DESCRIPTION OF THE PREFERRED EMBODIMENTS

Figure 1:
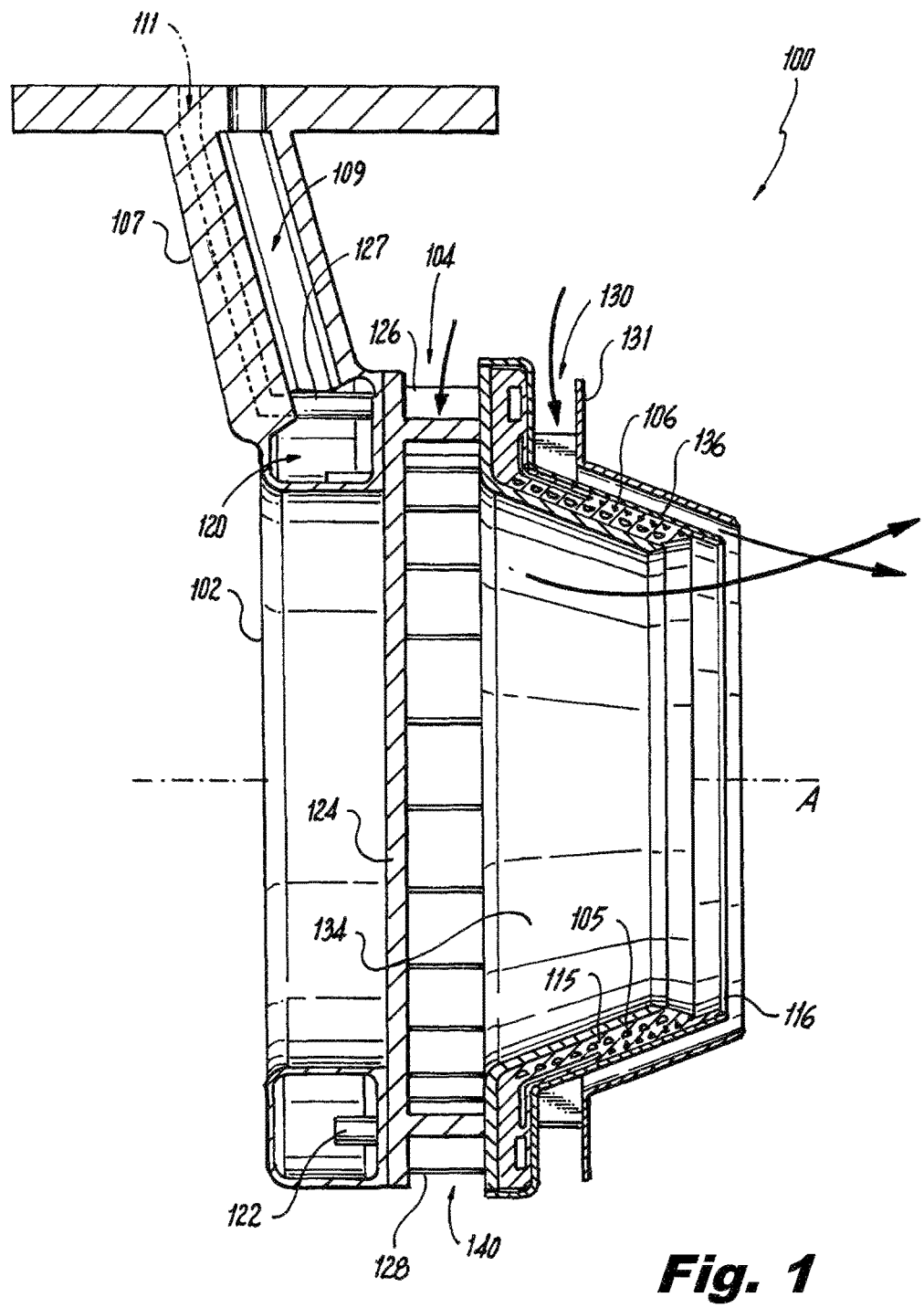
FIG. 1 is a cross-sectional side elevation view of a nozzle constructed in accordance with the present disclosure, showing the cooling circuit and the fuel circuit.

Reference will now be made to the drawings wherein like reference numerals identify similar structural features or aspects of the subject disclosure. For purposes of explanation and illustration, and not limitation, a cross-sectional view of an exemplary embodiment of a nozzle in accordance with the disclosure is shown in FIG. 1 and is designated generally by reference character 100. Other embodiments of nozzles in accordance with the disclosure, or aspects thereof, are provided in FIGS. 2-9, as will be described. The systems and methods described herein provide for radial swirl nozzles with increased cooling capability, for example, the ability to cool an annular fuel distributor even when the fuel distributor is not in use.

Figure 2:
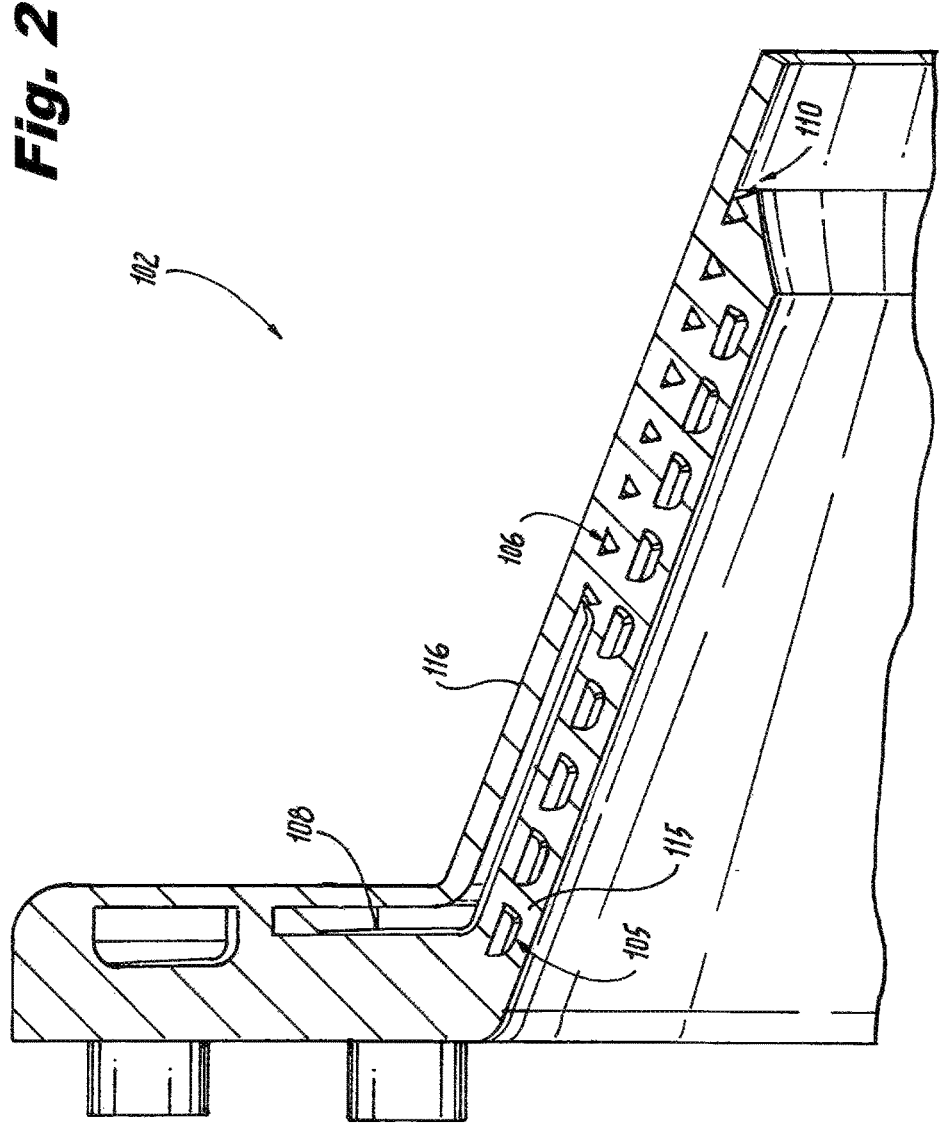
FIG. 2 is an enlarged cross-sectional side elevation view of a portion of the nozzle of FIG. 1, showing inner and outer fuel circuit walls.

As shown in FIGS. 1 and 2, a nozzle 100 includes a nozzle body 102 defining a longitudinal axis A. Nozzle body 102 includes a fuel circuit 106 and a cooling circuit 105. Both circuits are radially outboard from an air passage 104 with respect to longitudinal axis A. Fuel circuit 106 is defined between a fuel circuit inner wall 115 and a fuel circuit outer wall 116, e.g. the annular fuel distributor. It is contemplated that inner and outer fuel circuit walls 115 and 116, respectively, can be made from a metallic material, and/or can be made monolithically through additive manufacturing or casting. A portion of fuel circuit outer wall 116 is radially outboard from fuel circuit inner wall 115 with respect to longitudinal axis A. A portion of both fuel circuit inner wall 115 and outer wall 116 are conically shaped and converge toward longitudinal axis A. Fuel circuit annular outlet 110 is proximate to the outlet of air passage 104. Those skilled in the art will readily appreciate that cooling circuit 105 can use fuel that can be returned back to the fuel tank and/or fuel that is en route to an adjacent nozzle that is in use, e.g. has fuel flowing from an inlet to an outlet. It is also contemplated that cooling circuit 105 can use liquid coolant.

With continued reference to FIGS. 1 and 2, cooling circuit 105 is defined within fuel circuit inner wall 115 extending from an axial position proximate a fuel circuit inlet 108 to an axial position proximate fuel circuit outlet 110. It is also contemplated that cooling circuit 105 can be defined within fuel circuit outer wall 116, as described below with respect to FIG. 9. Air passage 104 is defined between a backing plate 124 and a jacket 134 downstream from backing plate 124. Those skilled in the art will readily appreciate that backing plate 124 and jacket 134 can be made from thin metallic materials and/or a thicker ceramic material, such as a ceramic-matrix composite (CMC) material, e.g. jacket 134 can be an insulation jacket.

As shown in FIG. 1, air passage 104 includes a radial swirler 140 at an annular inlet 126. Radial swirler 140 has radial swirl vanes 128 circumferentially spaced apart from one another about annular inlet 126 to induce swirl into air entering air passage 104. Large swirl offset and pure radial entry produces very high swirl and high radial pressure gradient at fuel outlet 110. A plurality of cylindrical fuel tubes 122 are defined through air passage 104. Each fuel tube 122 connects a respective circumferentially spaced apart opening 118 of fuel circuit inlet 108 to a fuel manifold 120. Tubes 122 can be metallic transfer tubes. It is also contemplated that in place of some of tubes 122, fasteners can also be used. Vanes 128, described above, can be hollow and/or ceramic, and insulate tubes 122 as they pass through air passage.

With continued reference to FIG. 1, an outer air passage 130 is defined radially outboard of fuel circuit 106 with respect to longitudinal axis A. Outer air passage 130 provides non-swirled air. Outer air passage 130 is between a jacket 136 and an outer air passage wall 131. It is contemplated jacket 136 and an outer air passage wall 131 can be constructed using a thin metallic material and/or thicker ceramic material, e.g. a CMC material. For example, jacket 136 can be a metallic shell and not provide any insulation and/or it can be a ceramic material and be an insulation jacket to insulate fuel circuit 106. Insulation jackets can be made from a ceramic or a ceramic composite material, both of which tend to reduce thermal growth mismatch. Metallic shells can be designed to mitigate thermal growth effects, e.g. by using slits, multiple pieces, growth gaps etc.

Figure 3:
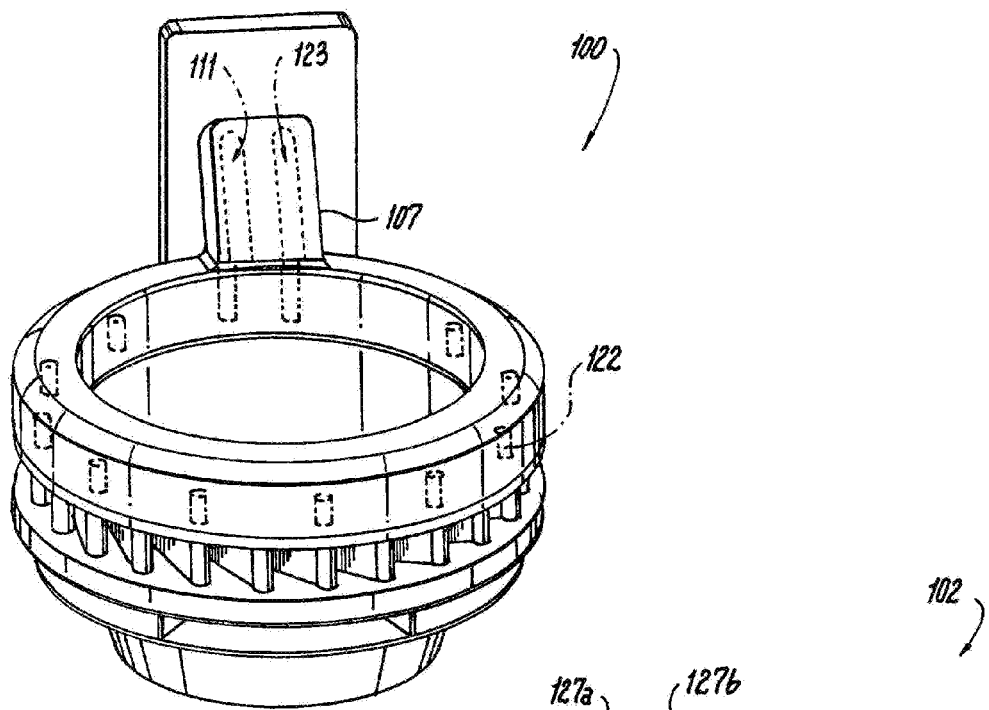
FIG. 3 is a perspective view of the back side of the nozzle of FIG. 1, showing coolant-in and coolant-out channels in the stem.

As shown in FIGS. 1 and 3, nozzle 100 includes a stem 107 operatively connected to fuel manifold 120 of nozzle body 102. Stem 107 includes a fuel channel 109 in fluid communication with fuel manifold 120 to provide fuel to fuel circuit inlet 108, shown in FIG. 2. Stem 107 includes a coolant-in channel 111 and a coolant-out channel 123. Those skilled in the art will readily appreciate that while fuel manifold 120 is shown integrally formed with backing plate 124, it can be formed independent of backing plate 124. Those skilled in the art will readily appreciate that embodiments of the present invention, e.g. nozzles 100, are easily manufactured radial swirlers that are lightweight. Nozzles 100 and can be additively manufactured, for example using direct metal laser sintering, or the like. Moreover, components of nozzle body 102 can be appropriately spaced to permit thermal expansion and contraction.

Figure 4:
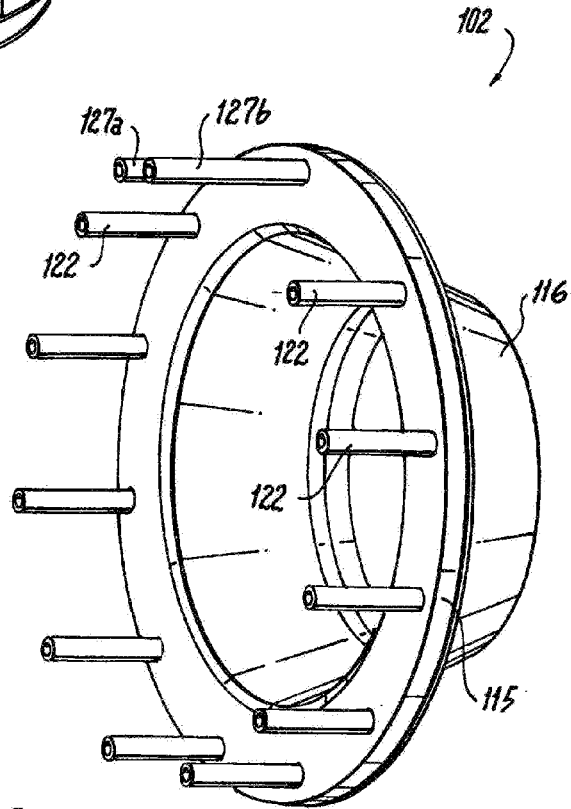
FIG. 4 is a perspective view of a portion of the nozzle of FIG. 1, showing the circumferentially spaced apart coolant and fuel tubes.
Figure 5:
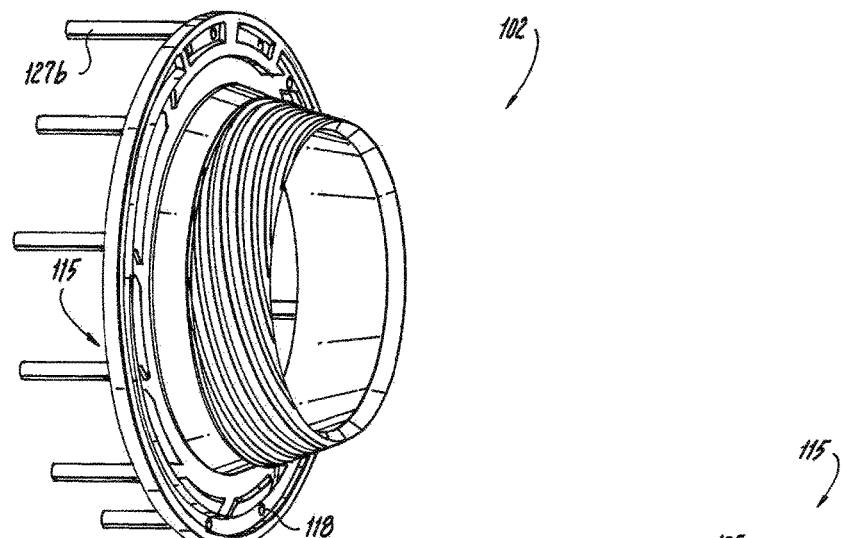
FIG. 5 is a perspective view of a portion of the nozzle of FIG. 1, showing the tubes connecting with inner fuel circuit wall.
Figure 6:
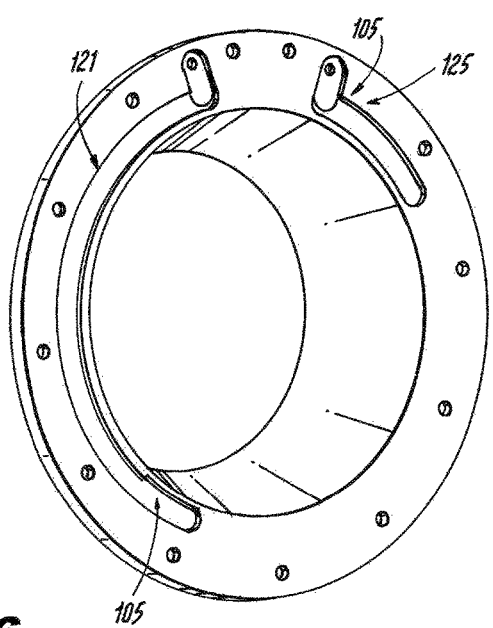
FIG. 6 is a perspective view of the back side of a portion of the nozzle of FIG. 1, showing the layer with the transfer tubes removed to show the distribution channel and collection channel within the inner fuel circuit wall.

As shown in FIGS. 4-6, fuel circuit inner wall 115 includes a pair of cylindrical coolant tubes 127 extending therefrom defined through air passage 104 and though fuel manifold 120, as shown in FIG. 1. Cooling circuit 105 includes a distribution channel 121 in fluid communication with coolant-in channel 111 and a collection channel 125 in fluid communication with a coolant-out channel 123. One of tubes 127 is a coolant-in tube 127a. Coolant-in tube 127a fluidly connects coolant-in channel 111 to distribution channel 121 to provide coolant thereto. Another one of tubes 127 is a coolant-out tube 127b. Coolant-out tube 127b fluidly connects to coolant-out channel 123 to collection channel 125 to receive exiting coolant therefrom. From coolant-out tube 127b, coolant can be returned to a storage tank, or if the coolant is fuel, it can be passed on to a nozzle that is in operation, as described above. Distribution channel 121 and collection channel 125 are circumferentially spaced apart from one another and are co-planar with one another. Tubes 127 are defined through radial swirl vanes 128, similar to fuel tubes 122, described above.

Figure 7:
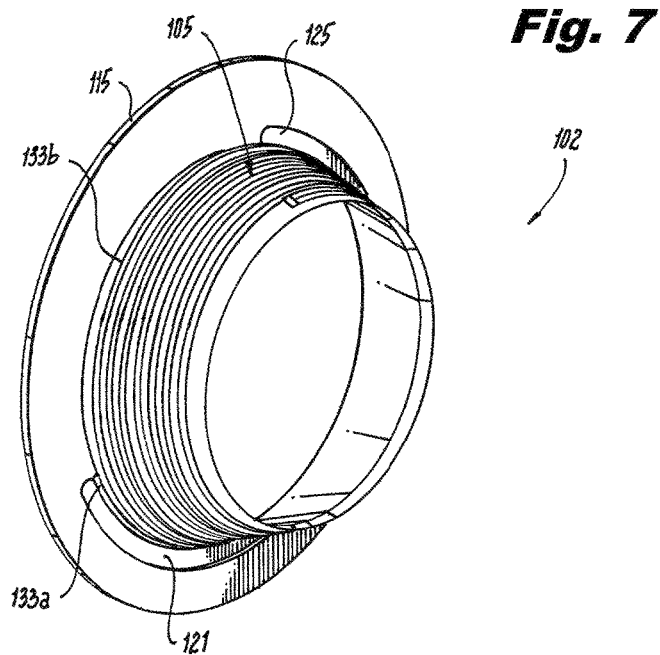
FIG. 7 is a perspective view of the front side of a portion of the nozzle of FIG. 1, showing the distribution channel and the collection channel within the inner fuel circuit wall connecting to the helical threads of the cooling circuit.
Figure 8:
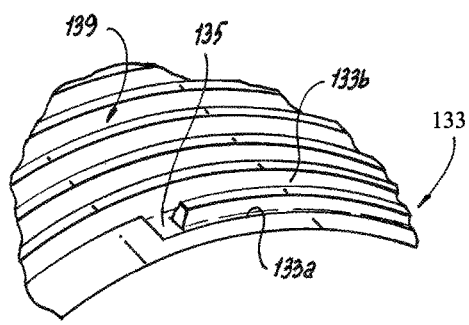
FIG. 8 is an enlarged perspective view from the front side of a portion of the nozzle of FIG. 1, showing the short circuit segment between helical threads of the cooling circuit.

As shown in FIGS. 7 and 8, cooling circuit 105 includes a pair of helical threads 133 that form a helical cooling channel 139. A first one of the helical threads 133a begins at distribution channel 121 and extends to an axial position proximate fuel circuit outlet 110 to provide cooling flow to the nozzle tip. A first end 135 of second helical thread 133b is connected to first helical thread 133a proximate to fuel circuit outlet 110 through a short circuit segment 137. Second helical thread 133b extends to collection channel 125 to provide a cooling flow exit to coolant-out channel 123. This allows the coolant to be fed from one port, e.g. coolant-in channel 111, and returned to another port, e.g. coolant-out channel 123.

With reference now to FIG. 9, a portion of another nozzle body 202 is shown. Nozzle body 202 is similar to nozzle body 102, except that cooling circuit 205 is defined in a fuel circuit outer wall 116. Those skilled in the art will readily appreciate that cooling circuit 205 can include a distribution channel in fluid communication with a coolant-in channel, similar to distribution channel 121 and coolant-in channel 111, and a collection channel in fluid communication with a coolant-out channel, similar to collection channel 125 and coolant-out channel 123. It is also contemplated that a nozzle body can include both cooling circuits 205 and 105, e.g. a cooling channel on both sides of a fuel circuit.

The methods and systems of the present disclosure, as described above and shown in the drawings provide for radial swirl nozzles with superior properties including increased cooling capability, even when fuel is not flowing through the fuel circuit of the fuel distributor. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A nozzle, comprising:
a nozzle body defining a longitudinal axis including:
an air passage;
a fuel circuit radially outboard from the air passage with respect to the longitudinal axis, the fuel circuit extending from a fuel circuit inlet to a fuel circuit annular outlet, wherein the fuel circuit is defined between a fuel circuit inner wall and a fuel circuit outer wall, wherein at least a portion of the fuel circuit outer wall is radially outboard from the fuel circuit inner wall with respect to the longitudinal axis;
a cooling circuit defined within at least one of the fuel circuit inner wall and the fuel circuit outer wall, wherein the cooling circuit extends from an axial position proximate the fuel circuit inlet to an axial position proximate the fuel circuit outlet, wherein the cooling circuit includes a pair of helical threads; and
a stem operatively connected to a fuel manifold of the nozzle body, wherein the stem includes:
a coolant-in channel in fluid communication with a distribution channel of the cooling circuit, wherein the coolant-in channel is configured and adapted to provide coolant to the distribution channel, and
a coolant-out channel in fluid communication with a collection channel of the cooling circuit, wherein the coolant-out channel is configured and adapted to receive coolant from the collection channel, wherein a first one of the helical threads begins at the distribution channel and extends to an axial position proximate the fuel circuit outlet to provide cooling flow to a tip of the nozzle, and wherein a first end of a second one of the helical threads is connected to the first helical thread proximate to the fuel circuit outlet and extends to the collection channel to provide a cooling flow exit to the coolant-out channel.

2. A nozzle as recited in claim 1, wherein the stem includes a fuel channel in fluid communication with the fuel manifold to provide fuel to the fuel circuit inlet.

3. A nozzle as recited in claim 1, wherein the distribution channel and the collection channel are at least one of: circumferentially spaced apart from one another, or coplanar.

4. A nozzle as recited in claim 1, wherein the first end of the second one of the helical threads is connected to the first helical thread through a short circuit segment.

5. A nozzle as recited in claim 1, wherein the nozzle body includes a pair of tubes defined through the air passage and though the fuel manifold, wherein one of the tubes fluidly connects the distribution channel to the coolant-in channel and the other one of the tubes fluidly connects the collection channel to the coolant-out channel.

6. A nozzle as recited in claim 5, wherein the air passage includes an annular inlet having radial swirl vanes circumferentially spaced apart from one another, wherein the tubes are defined within the radial swirl vanes.

7. A nozzle as recited in claim 1, wherein the air passage is defined between a backing plate and the fuel circuit inner wall downstream from the backing plate, wherein at least a portion of the fuel circuit inner wall is a conical shape that converges toward the longitudinal axis in a downstream direction.

8. A nozzle as recited in claim 1, wherein the air passage includes a radial swirler, a converging conical cross-section, and an annular inlet, wherein the radial swirler includes radial swirl vanes circumferentially spaced apart from one another about the annular inlet to induce swirl into air entering the annular inlet of the air passage.

9. A nozzle as recited in claim 1, wherein the nozzle body includes an outer air passage defined radially outboard of the fuel circuit with respect to the longitudinal axis.

10. A nozzle as recited in claim 9, wherein the outer air passage is defined between the fuel circuit outer wall and an outer air passage wall, and wherein the outer air passage is a converging non-swirling outer air passage.

11. A nozzle, comprising:
a nozzle body defining a longitudinal axis including:
an air passage;
a fuel circuit radially outboard from the air passage with respect to the longitudinal axis, the fuel circuit extending from a fuel circuit inlet to a fuel circuit annular outlet, wherein the fuel circuit is defined between a fuel circuit inner wall and a fuel circuit outer wall, wherein at least a portion of the fuel circuit outer wall is radially outboard from the fuel circuit inner wall with respect to the longitudinal axis;
a cooling circuit defined within at least one of the fuel circuit inner wall and the fuel circuit outer wall, wherein the cooling circuit extends from an axial position proximate the fuel circuit inlet to an axial position proximate the fuel circuit outlet;
a stem operatively connected to a fuel manifold of the nozzle body, wherein the stem includes:
a coolant-in channel in fluid communication with a distribution channel of the cooling circuit, wherein the coolant-in channel is configured and adapted to provide coolant to the distribution channel, and
a coolant-out channel in fluid communication with a collection channel of the cooling circuit, wherein the coolant-out channel is configured and adapted to receive coolant from the collection channel; and
a pair of tubes defined through the air passage and though the fuel manifold, wherein one of the tubes fluidly connects the distribution channel to the coolant-in channel and the other one of the tubes fluidly connects the collection channel to the coolant-out channel.

12. A nozzle as recited in claim 11, wherein the stem includes a fuel channel in fluid communication with the fuel manifold to provide fuel to the fuel circuit inlet.

13. A nozzle as recited in claim 11, wherein the distribution channel and the collection channel are at least one of: circumferentially spaced apart from one another, or co-planar.

14. A nozzle as recited in claim 11, wherein the cooling circuit includes a pair of helical threads, wherein a first one of the helical threads begins at the distribution channel and extends to an axial position proximate the fuel circuit outlet to provide cooling flow to a tip of the nozzle, and wherein a first end of a second one of the helical threads is connected to the first helical thread proximate to the fuel circuit outlet and extends to the collection channel to provide a cooling flow exit to the coolant-out channel.

15. A nozzle as recited in claim 14, wherein the first end of the second one of the helical threads is connected to the first helical thread through a short circuit segment.

16. A nozzle as recited in claim 11, wherein the air passage includes an annular inlet having radial swirl vanes circumferentially spaced apart from one another, wherein the tubes are defined within the radial swirl vanes.

17. A nozzle as recited in claim 11, wherein the air passage is defined between a backing plate and the fuel circuit inner wall downstream from the backing plate, wherein at least a portion of the fuel circuit inner wall is a conical shape that converges toward the longitudinal axis in a downstream direction.

18. A nozzle as recited in claim 11, wherein the air passage includes a radial swirler, a converging conical cross-section, and an annular inlet, wherein the radial swirler includes radial swirl vanes circumferentially spaced apart from one another about the annular inlet to induce swirl into air entering the annular inlet of the air passage.

19. A nozzle as recited in claim 11, wherein the nozzle body includes an outer air passage defined radially outboard of the fuel circuit with respect to the longitudinal axis.

20. A nozzle as recited in claim 19, wherein the outer air passage is defined between the fuel circuit outer wall and an outer air passage wall, and wherein the outer air passage is a converging non-swirling outer air passage.

\* \* \* \* \*